United States Patent
Lee et al.

(10) Patent No.: US 11,409,268 B2
(45) Date of Patent: Aug. 9, 2022

(54) REINFORCEMENT LEARNING AND SIMULATION BASED DISPATCHING METHOD IN A FACTORY, AND AN APPARATUS THEREOF

(71) Applicant: VMS Solutions Co., Ltd., Yongin-si (KR)

(72) Inventors: Won-Jun Lee, Daejeon (KR); Byung-Hee Kim, Yongin-si (KR); Goo-Hwan Chung, Yongin-si (KR)

(73) Assignee: VMS Solutions Co.. Ltd., Yongin-si (KR)

( * ) Notice: Subject to any disclaimer, the term of this patent is extended or adjusted under 35 U.S.C. 154(b) by 225 days.

(21) Appl. No.: 16/892,818

(22) Filed: Jun. 4, 2020

(65) Prior Publication Data
US 2020/0393820 A1 Dec. 17, 2020

(30) Foreign Application Priority Data
Jun. 17, 2019 (KR) ........................ 10-2019-0071369

(51) Int. Cl.
*G06F 9/44* (2018.01)
*G06F 9/455* (2018.01)
*G06F 9/445* (2018.01)
*G05B 19/418* (2006.01)
*G06N 20/00* (2019.01)
*G06K 9/62* (2022.01)

(52) U.S. Cl.
CPC ... *G05B 19/41865* (2013.01); *G05B 19/4188* (2013.01); *G05B 19/41885* (2013.01); *G06K 9/6297* (2013.01); *G06N 20/00* (2019.01)

(58) Field of Classification Search
CPC .......... G06N 20/00; G06N 3/006; G06N 3/08; G06N 3/0545; G06N 7/005; G06N 3/0454; G05B 19/41865; G05B 19/4188; G05B 19/41885
See application file for complete search history.

(56) References Cited

U.S. PATENT DOCUMENTS 11,091,211 B1 * 8/2021 Ebrahimi Afrouzi .. B62D 63/02
2020/0076857 A1 * 3/2020 Van Seijen ............ G06N 20/00

OTHER PUBLICATIONS

Kent et al., Learning Sequential Decision Tasks for Robot Manipulation with Abstract Markov Decision Processes and Demonstration-Guided Exploration, 8 pages (Year: 2018).*
Riedmiller et al., "A neural reinforcement learning approach to learn local dispatching policies in production scheduling", IJCAI, 1999, vol. 2, pp. 764-769 (6 pages total).
Das et al., "Solving Semi-Markov Decision Problems using Average Reward Reinforcement Learning", Management Science, 1999, vol. 45, No. 4, pp. 1-32 (32 pages total).

* cited by examiner

*Primary Examiner* — Thuy Dao
(74) *Attorney, Agent, or Firm* — Sughrue Mion, PLLC

(57) ABSTRACT

Provided is a dispatching method in a factory based on reinforcement learning. The dispatching method in a factory based on reinforcement learning may comprise: constructing a Markov decision process (MDP) for dispatching actions of a dispatcher in the factory and resulting rewards and states of the factory; performing learning by applying reinforcement learning (RL) to the constructed MDP; and as a result of said RL, selecting a job that maximizes a weighted sum of a plurality of scored dispatching rules.

10 Claims, 7 Drawing Sheets

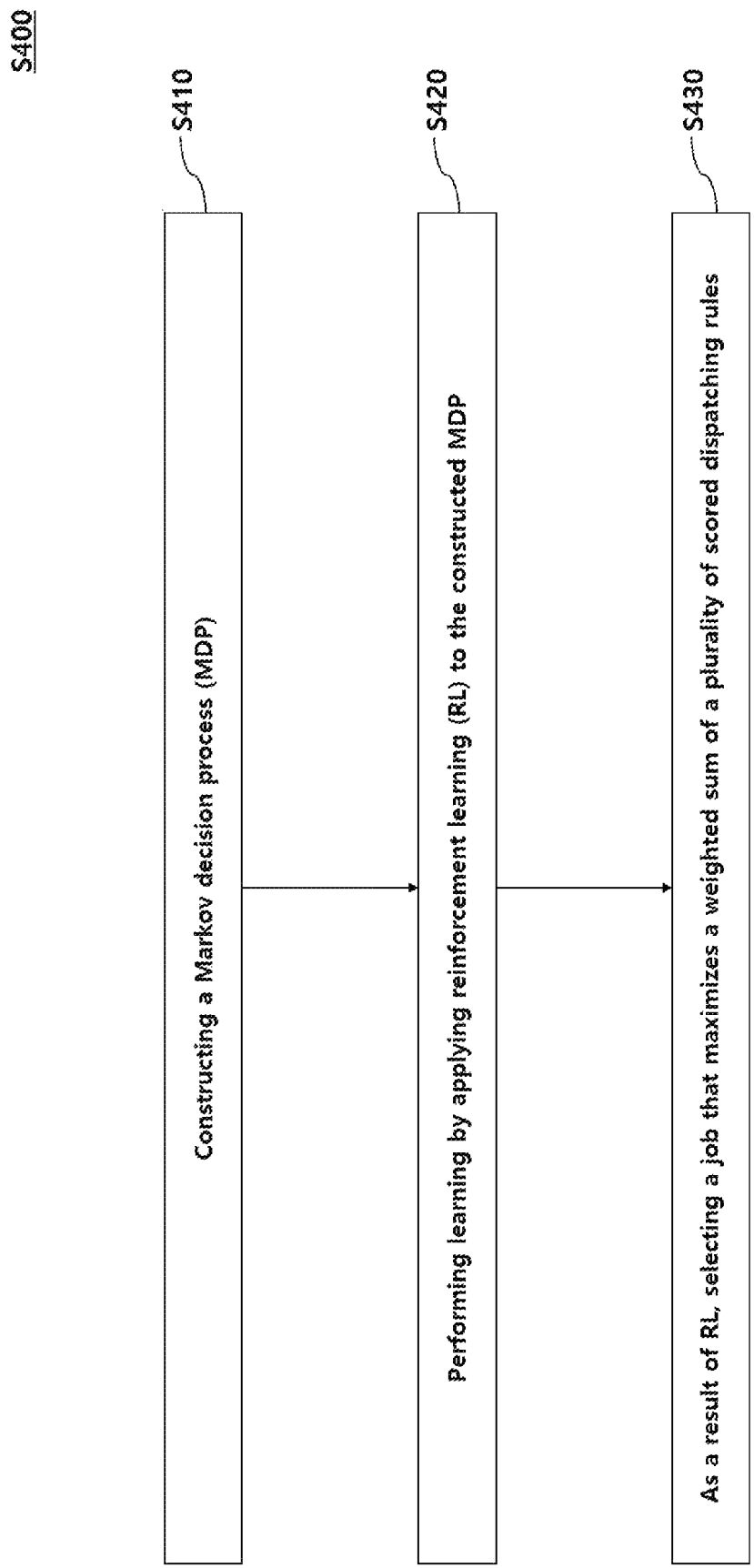

REINFORCEMENT LEARNING AND SIMULATION BASED DISPATCHING METHOD IN A FACTORY, AND AN APPARATUS THEREOF

CROSS REFERENCE TO RELATED APPLICATIONS

This application is based on and claims priority from Korean Patent Application No. 10-2019-0071369, filed on Jun. 17, 2019 with the Korean Intellectual Property Office, the disclosure of which is incorporated herein in its entirety by reference.

FIELD OF THE DISCLOSURE

The present invention generally relates to a dispatching method and apparatus in a factory based on reinforcement learning, and more particularly, to a dispatching method and apparatus in a factory based on reinforcement learning that enable the operational performance and efficiency of the entire factory to be significantly improved through reinforcement learning of rewards for the actions performed by a dispatcher and states in an environment in which various pieces of equipment are provided in the factory.

BACKGROUND

Factories, for example, semiconductor fabrication plants (also referred to as "fabs" for short) are one of the most sophisticated man-made systems, and usually consist of hundreds or thousands of pieces of expensive equipment connected to automated resource handling systems. Constructing an optimal operation schedule in a factory (or a fab) comprising such a large number of pieces of equipment can greatly improve the productivity of the factory.

Conventionally, in order to prepare an operation schedule for a large number of pieces of equipment arranged in a factory, a heuristic solution method based on parameters tuned by humans such as an expert has often been used; however, such a method has a drawback in that human intervention is required every time to establish an operation schedule in the factory, thereby limiting the operational efficiency of the factory.

In particular, it is clear that the heuristic solution method by humans as described above has limitations in establishing a dispatching policy for selecting and ordering available jobs to be performed in each workplace, and accordingly, there is an urgent need to develop and circulate an alternative method to overcome such drawbacks.

Therefore, there is an increasing demand in the art for a new type of a dispatching method and apparatus in a factory that enable to achieve simultaneously multiple objectives to be pursued in the factory by implementing dispatching more efficiently in an environment within the factory in which a large number of various pieces of equipment are arranged.

SUMMARY OF THE INVENTION

The present invention is devised to solve the problems mentioned above, and it is an object of the present invention to provide a dispatching method and apparatus in a factory based on reinforcement learning that can select a job that maximizes the weighted sum of a plurality of dispatching scores by performing reinforcement learning on actions, rewards, and states in an environment within the factory, thereby maximizing the operational efficiency of the factory.

In addition, it is another object of the present invention to provide a dispatching method and apparatus in a factory based on reinforcement learning that can be applied more adaptively to an actual factory environment by changing and applying a Markov decision process by taking into account the characteristics of the actions of a dispatcher occurring in an environment within the factory.

Furthermore, it is yet another object of the present invention to provide a dispatching method and apparatus in a factory based on reinforcement learning that can learn and select, through reinforcement learning, a dispatching action that can simultaneously satisfy various objectives to be pursued in an environment within the factory, thereby maximizing the operational efficiency of the factory.

The technical objects of the present invention are not limited to those mentioned above, and other technical objects that have not been mentioned will be clearly understood by those having ordinary skill in the art from the following descriptions.

In order to achieve the technical objects described above, a dispatching method in a factory based on reinforcement learning in accordance with an embodiment of the present invention may comprise: constructing a Markov decision process (MDP) for dispatching actions of a dispatcher in the factory and resulting rewards and states of the factory; performing learning by applying reinforcement learning (RL) to the constructed MDP; and as a result of said RL, selecting a job that maximizes a weighted sum of a plurality of scored dispatching rules.

In addition, the MDP may be constructed as a semi-Markov decision process (semi-MDP) based on decisions occurring at irregular intervals in a continuous-time horizon.

Further, the rewards may be set in a direction that simultaneously satisfies a plurality of objectives in the factory.

Moreover, said RL may be based on an estimation of a value function through an approximation of the value function.

Furthermore, as a result of the approximation of the value function, the value function may be expressed as a product of a parameter vector and a dispatching score vector.

In addition, the dispatching score vector may correspond to a vector of dispatching scores for a last selected job in a machine in question.

Further, the selecting a job that maximizes a weighted sum of a plurality of scored dispatching rules may comprise selecting a job that maximizes a value of the approximated value function.

In order to achieve the technical objects described above, a dispatcher configured to perform dispatching actions in a factory based on reinforcement learning in accordance with another embodiment of the present invention may comprise: a Markov decision process (MDP) construction unit configured to construct an MDP for the dispatching actions of the dispatcher in the factory and resulting rewards and states of the factory; a reinforcement learning unit configured to perform learning by applying reinforcement learning (RL) to the constructed MDP; and a job selection unit configured to select a job that maximizes a weighted sum of a plurality of scored dispatching rules, as a result of said RL.

Furthermore, the MDP construction unit may be further configured to construct the MDP as a semi-Markov decision process (semi-MDP) based on decisions occurring at irregular intervals in a continuous-time horizon.

According to the dispatching method and apparatus in a factory based on reinforcement learning in accordance with an embodiment of the present invention, it is possible to select a job that maximizes the weighted sum of a plurality of dispatching scores by performing reinforcement learning on actions, rewards, and states in an environment within the factory, thereby maximizing the operational efficiency of the factory.

In addition, according to the dispatching method and apparatus in a factory based on reinforcement learning in accordance with an embodiment of the present invention, it is possible to apply more adaptively to an actual factory environment by changing and applying a Markov decision process by taking into account the characteristics of the actions of a dispatcher occurring in an environment within the factory.

Moreover, according to the dispatching method and apparatus in a factory based on reinforcement learning in accordance with an embodiment of the present invention, it is possible to learn and select, through reinforcement learning, a dispatching action that can simultaneously satisfy various objectives to be pursued in an environment within the factory, thereby maximizing the operational efficiency of the factory.

BRIEF DESCRIPTION OF THE DRAWINGS

For a better understanding of the drawings discussed in the detailed description of the present invention, a brief description of each drawing is provided, in which:

FIG. 4 is a flowchart for a dispatching method S400 in a factory based on reinforcement learning in accordance with an embodiment of the present invention.

DETAILED DESCRIPTION OF THE PREFERRED EMBODIMENTS

Figure 1A:
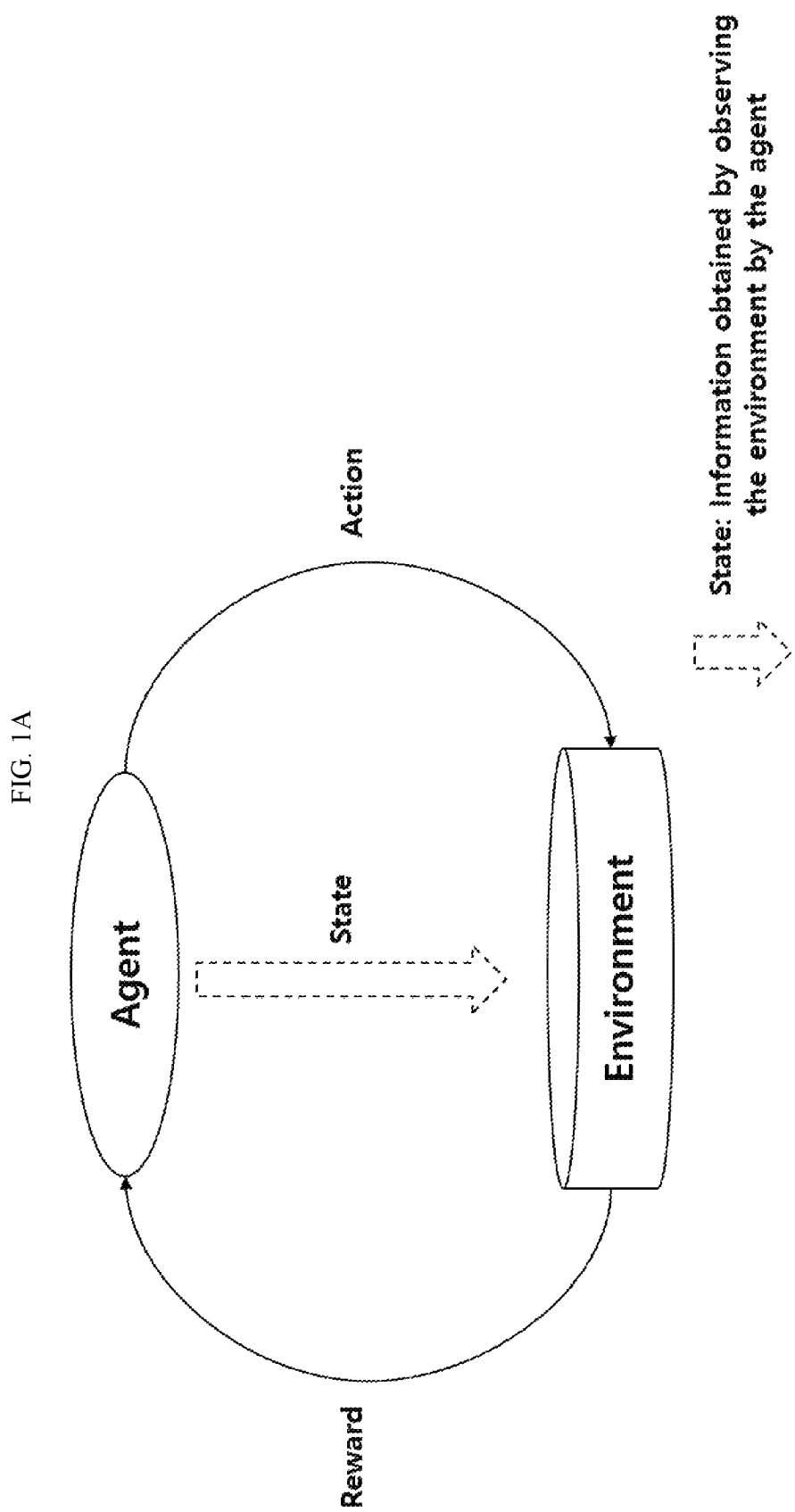
FIG. 1A is a schematic diagram for describing basic elements constituting reinforcement learning (RL)

Hereinafter, embodiments in accordance with the present invention will now be described with reference to the accompanying drawings. It should be noted that in assigning reference numerals to components of each drawing, the same components are given the same reference numerals if possible, even when they are illustrated in different drawings. Furthermore, in describing embodiments of the present invention, if it is considered that detailed descriptions of related known configurations or functions get in the way of the understanding of the embodiments of the present invention, such detailed descriptions will be omitted. Hereinafter, embodiments of the present invention will be described; however, the spirit of the present invention is not limited or confined thereto, and may be modified and implemented in a variety of ways by those having ordinary skill in the art.

Throughout the specification, when a part is described to be "connected" to another part, this includes not only a case being "directly connected" but also a case being "indirectly connected" via another element therebetween. Throughout the specification, when a part is described to "include" a component, this does not mean to exclude other components but may further include other components unless described otherwise. In addition, terms such as a first, a second, A, B, (a), and (b) may be used in describing components of the embodiments of the present invention. These terms are only for distinguishing one component from another, and the nature, order, sequence, or the like of the components is not limited by such terms.

FIG. 1A is a schematic diagram for describing basic elements constituting reinforcement learning (RL). RL is an area of machine learning (ML), and corresponds to a learning method in which an agent defined in a given environment recognizes a current state and selects an action or a sequence of actions to maximize rewards out of selectable actions.

An agent refers to a subject that observes a state and selects an action; an environment is, when the agent takes an action, what changes its state through interaction and offers a reward; a state refers to information indicative of the current situation of the environment; an action refers to what the agent takes in the current state; and a reward corresponds to information that represents an action is good or bad, and the agent, environment, action, reward, and state that constitute RL are conceptually illustrated in FIG. 1A. What is important here is that the rewards must match well with a single or plurality of objectives to be improved, and the states must represent the environment well.

RL that targets learning in a dynamic environment is distinguished from supervised learning for training a computer with labeled (i.e., an explicit correct answer) data in a static environment and unsupervised learning used to discover hidden features or structures of data by training a computer with no labeled data in a static environment.

For reference, RI, is being utilized and applied or research and development thereof are actively in progress in the field of games such as Google's AlphaGo, in the field of intelligent robots such as Atlas, a humanoid robot made by Boston Dynamics, in the field of finance such as P Morgan's LXOM, in the field of autonomous vehicles based on camera or sensor data installed on automobiles, and so on.

Figure 1B:
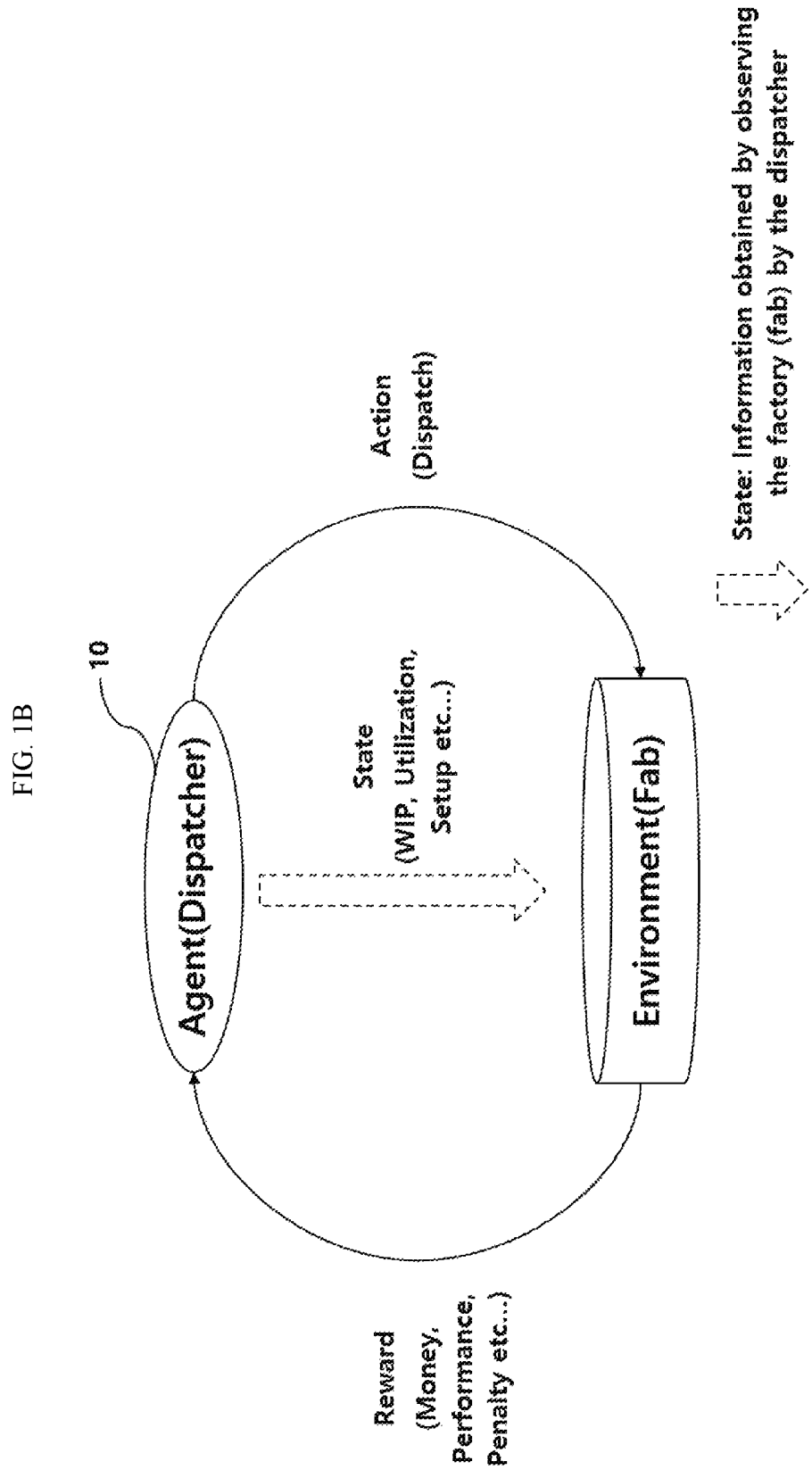
FIG. 1B is a conceptual diagram configured by reflecting RL of FIG. 1A to a factory environment in accordance with an embodiment of the present invention.

FIG. 1B is a conceptual diagram configured by reflecting RL of FIG. 1A to a factory environment in accordance with an embodiment of the present invention. In utilizing RL consisting of such elements as the agent, environment, action, reward, and state for dispatching in a factory, a dispatcher 10 may serve as an agent and rewards (such as cost, performance, penalty, etc.) for the dispatching actions of the dispatcher and states (such as WIP, utilization, setup, etc.) may be defined with the factory (or fab) being an environment, where the states may refer to information obtained by observing the factory by the dispatcher 10.

Figure 2A:
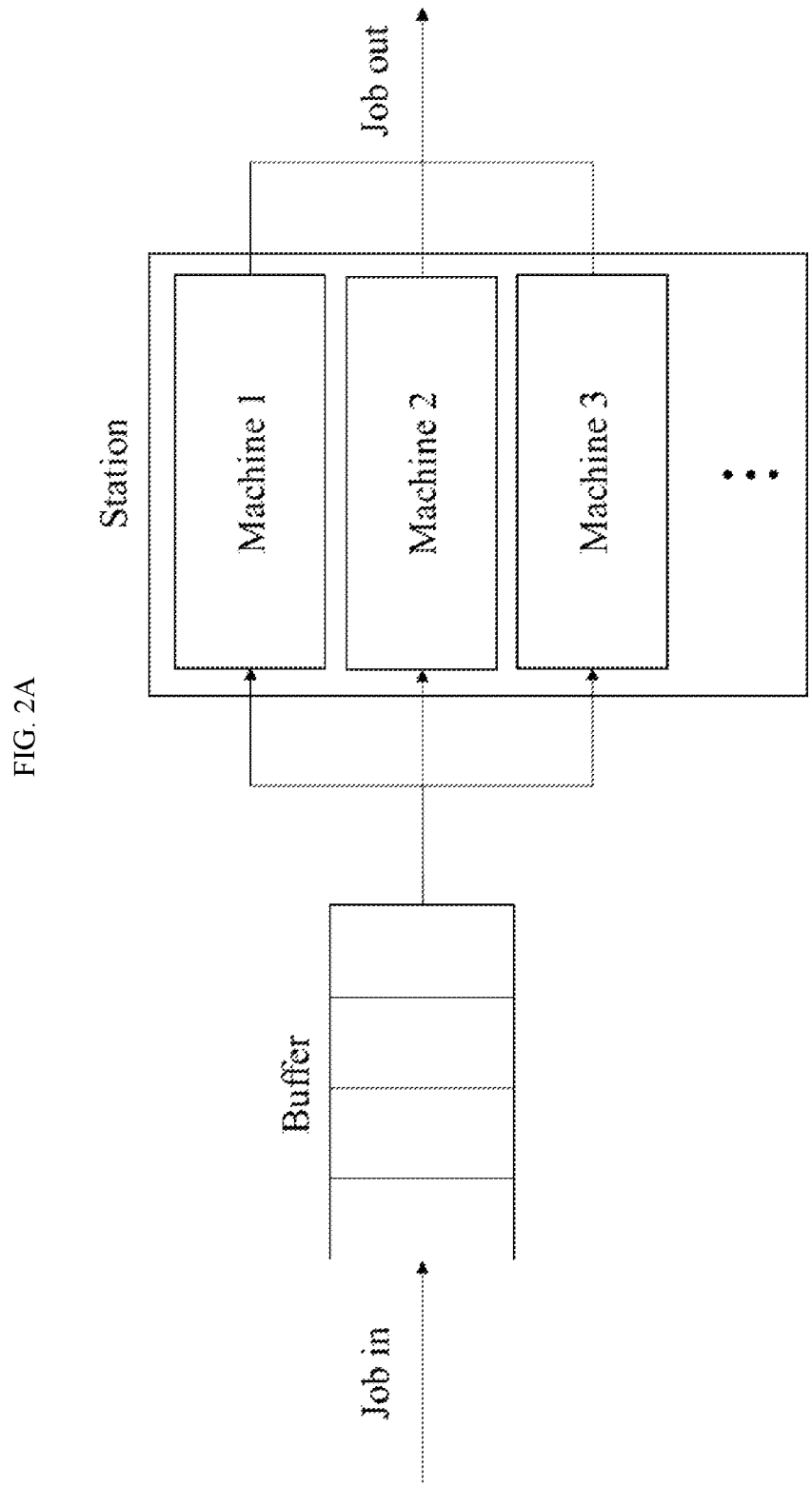
FIG. 2A schematically illustrates a fundamental unit of a re-entrant line model that is the basis of a factory to which a dispatching method in accordance with an embodiment of the present invention is applied.

FIG. 2A schematically illustrates a fundamental unit of a re-entrant line model that is the basis of a factory to which a dispatching method in accordance with an embodiment of the present invention is applied. In an actual factory, hundreds to thousands of pieces of equipment are arranged, each of which takes charge of different processes, and products have to go through hundreds of process steps in the factory prior to completion. In order to implement such process steps, a factory may be represented as a re-entrant line model (e.g., as shown in FIG. 1A), and during production, products need to go through hundreds of process steps and there are cases in which products need to visit the same process steps several times. In other words, products will be re-routed to some of the steps that have already been visited.

Figure 2B:
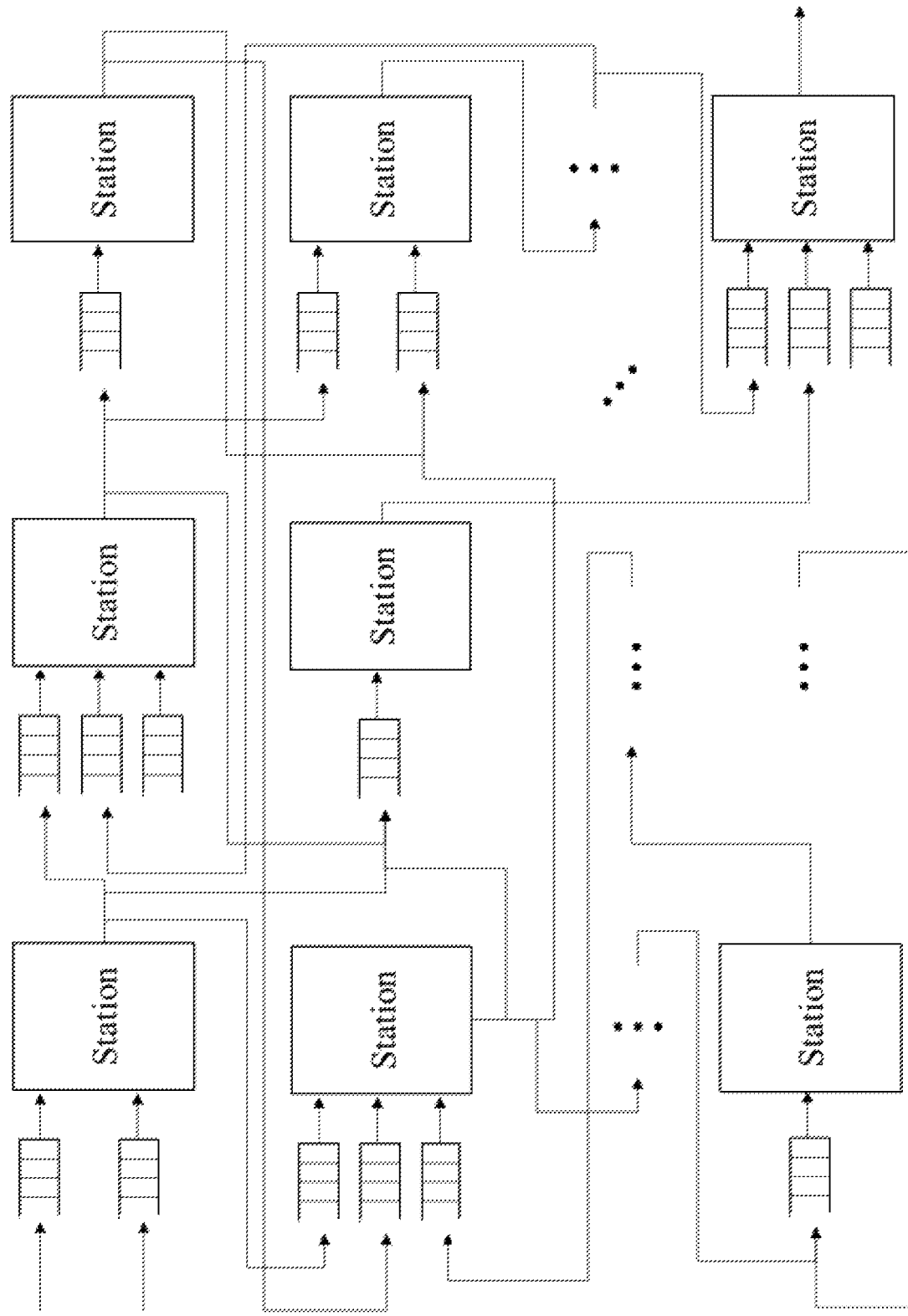
FIG. 2B schematically illustrates a layout diagram of a factory implemented by combining a plurality of fundamental units of the re-entrant line model illustrated in FIG. 2A.

FIG. 2A illustrates the fundamental unit of the re-entrant line as described above. A set of machines that perform the same process is referred to as a station, and each station includes a plurality of machines and a buffer. Jobs arriving at the buffer wait in the buffer until suitable machines select them according to predetermined dispatching logic. A series of relationships that indicate which jobs are processed by which machines is referred to as a job arrangement. For reference, a job arrangement may vary depending on job types, so that some of the jobs may be arranged in all the machines in the station and some other of the jobs may be arranged in only one machine within the station. A layout diagram of an actual factory (or a fab) implemented by combining a plurality of fundamental units of such a re-entrant line model is schematically illustrated in FIG. 2B.

In order to implement dispatching that selects and establishes the order of available jobs to be processed at each workshop in the factory as described above, dispatching rules such as First In First Out (FIFO), Shortest Processing Time (SPT), Earliest Due Date (EDD), and so on are established and utilized, and a dispatching method in a factory based on reinforcement learning in accordance with an embodiment of the present invention is characterized by selecting a job that maximizes a weighted sum of a plurality of scored dispatching rules as will be described later. For reference, the term 'dispatching' may also be used interchangeably with the terms 'loading' and 'scheduling' according to various use examples in various embodiments.

To this end, diverse dispatching scores may be utilized, the dispatching rules may be transformed into scores and used, and for example, factory operators may transform dispatching rules into scores and use them based on the situations and needs of the factory. These dispatching scores reflect comprehensive information about the factory situation at the moment of dispatching, and accordingly, may serve as an indicator that represents the overall situation of the factory. Table 1 below describes examples of dispatching scores.

TABLE 1

Examples of Dispatching Scores

| Dispatching score | Description |
| --- | --- |
| FIFO | Assigns a larger value to a job that arrives earlier than others. |
| SPT/LPT | Assigns a larger value to a job that has a shorter/longer processing time than others. |
| Setup | Assigns 0 if a job causes a setup change, otherwise 1. |
| Required Eqp | Assigns a ratio of machines that have tool settings for a job to the total number of machines in the current station. |
| Queue Time | Assigns a larger value to a job closer to a pre-defined queue time limit. If a job exceeds the limit, assigns 0. |
| Target Data | Assigns a large value to a job closer to a pre-defined due date. If a job exceeds the due date, assigns 1. |
| Layer Change | Assigns 0 if a job causes a layer change, otherwise 1. |

Figure 3A:
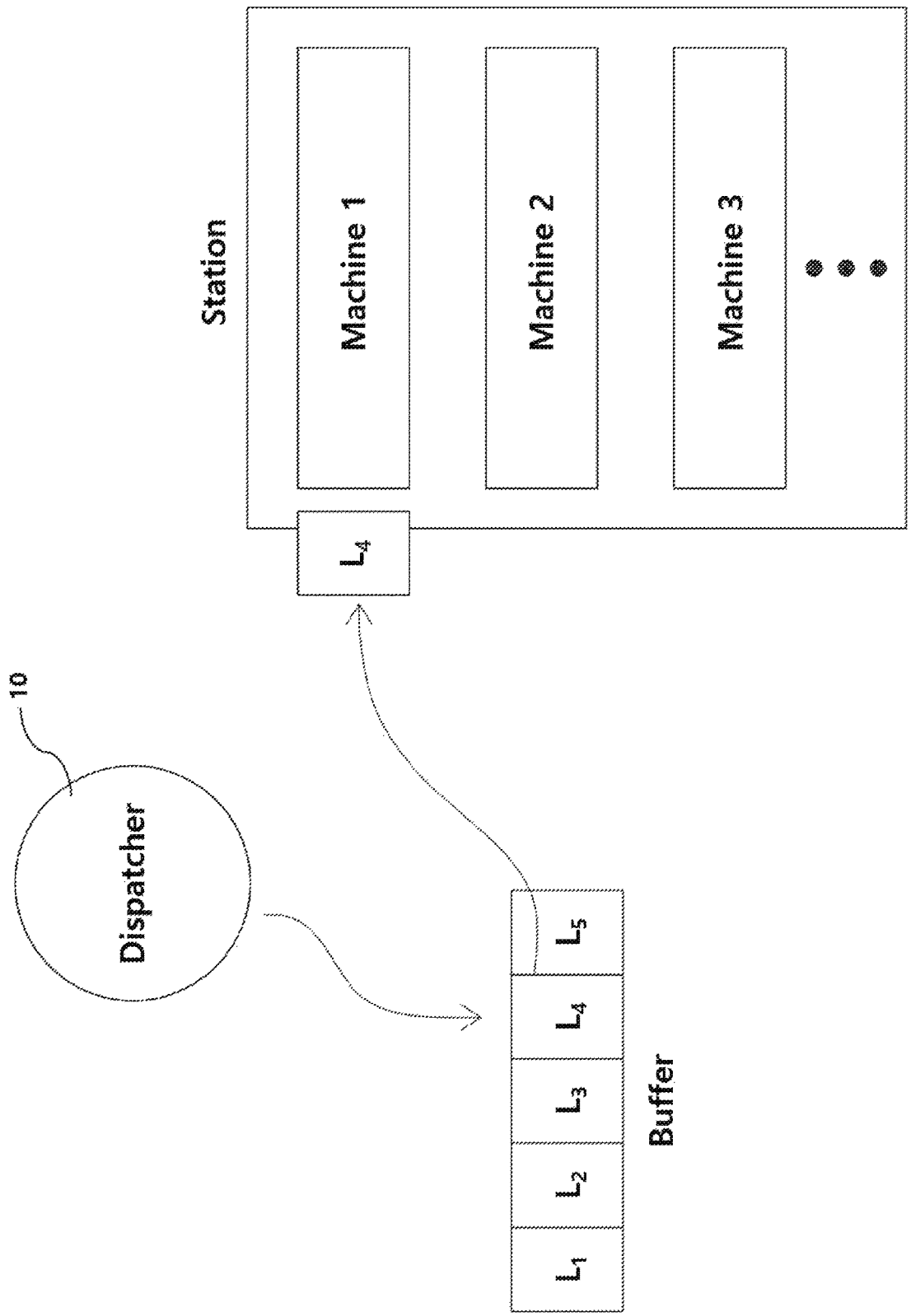
FIG. 3A is a conceptual diagram for describing a job selection of a dispatcher 10 in accordance with an embodiment of the present invention.
Figure 3B:
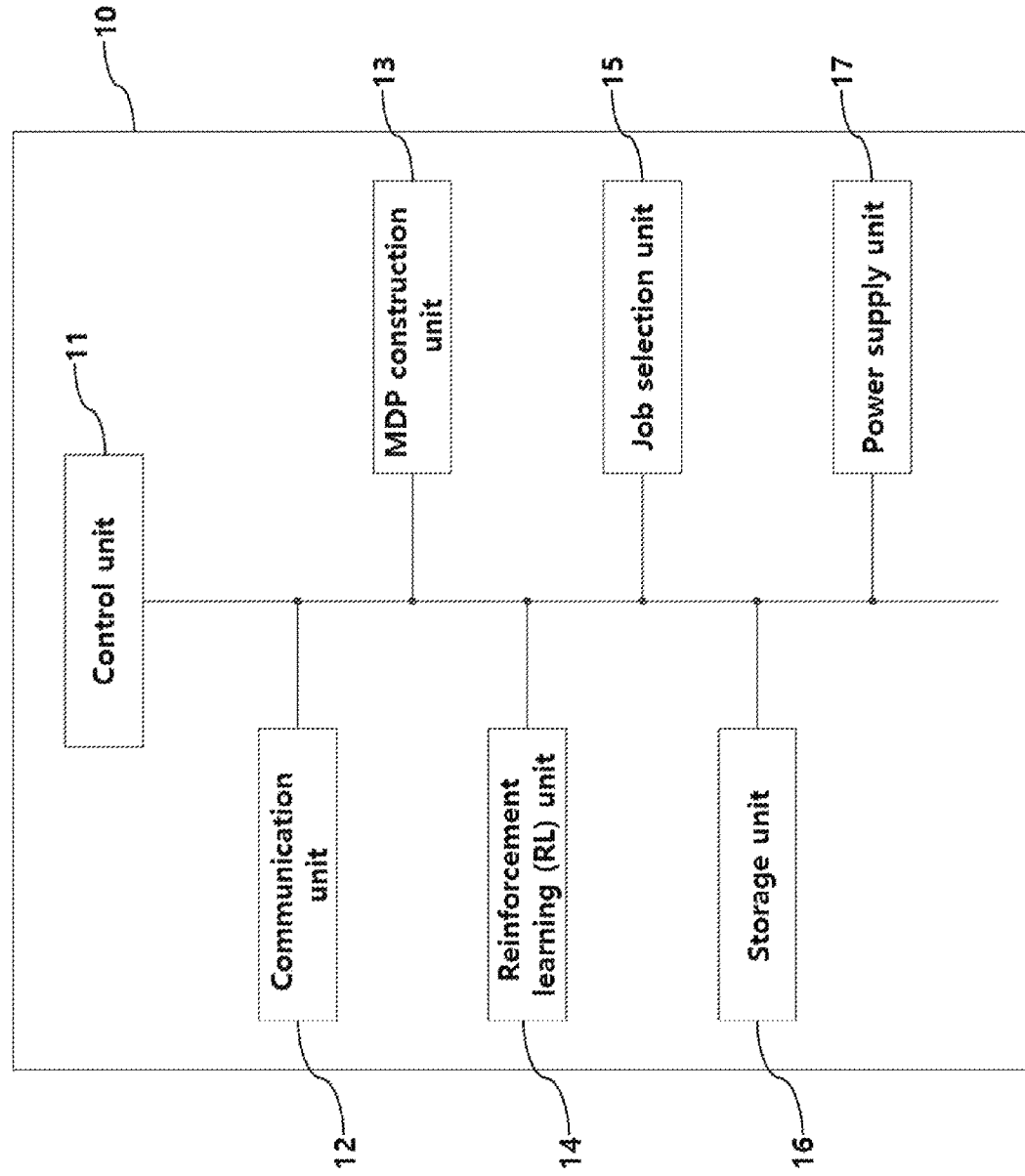
FIG. 3B is a detailed block diagram of the dispatcher 10 illustrated in FIG. 3A.

FIG. 3A is a conceptual diagram for describing a job selection of a dispatcher 10 in accordance with an embodiment of the present invention, and FIG. 3B is a detailed block diagram of the dispatcher 10 illustrated in FIG. 3A. A dispatching method in a factory based on reinforcement learning in accordance with an embodiment of the present invention is characterized by (i) constructing a Markov decision process (MDP) for the dispatching actions of the dispatcher 10 in the factory and the resulting rewards and the states of the factory, (ii) performing learning by applying reinforcement learning (RL) to the constructed MDP, (iii) selecting a job with the highest weighted sum of scored dispatching rules (see FIG. 3A), and (iv) approximating a value function of the factory with the dispatching rules used in (iii), and finding a weight that provides a better schedule as a result of reinforcement learning.

In the following, the dispatching method and apparatus in a factory based on reinforcement learning to be achieved in the present invention will be described in more detail through the description of RL that is the basis of the dispatching method in a factory in accordance with the present invention, the description of the MDP and a semi-Markov decision process (semi-MDP), and the description of the approximation of value function.

Markov Decision Process (MDP) and Reinforcement Learning (RL)

The first step in the application of RL is to define the problem to be solved in the form of an MDP. Here, the rewards as defined in the specification below may be set in a direction that simultaneously satisfies a plurality of objectives in the factory, and it is desirable to set them to have a low correlation between key performance indicators (KPIs) for the plurality of objectives to be achieved. This is because it can affect to cause the variance in learning steps to increase meaninglessly, which in turn leads to a wrong learning direction or slow learning.

In the MDP, an agent takes action when it encounters a state, a function for connecting actions that can be taken appropriately according to each state is referred to as a policy, and accordingly, the MDP is assessed in its value based on the actions, and the highest objective of the MDP is to find the best decision-making policy, that is, the decision-making policy that has the largest sum of values based on actions.

The MDP is specified by a collection of objects <T, S, A, P (·|s, a), R (s, a)>, where T is a discrete-time horizon, S is a state space, A is an action space, P (·|s, a) is a state transition probability, and R (s, a) is a reward function. Since factories fall into a complex system composed of various machines, jobs, and processes and accordingly, it is practically impossible to calculate the state transition probability P (·|s, a) exactly, under the premise that given the fact that a Markov process is in a state, the future process from that point on is independent of the past process up to that state (i.e., given the present, the future is independent of the past), it can be assumed that the state transition probability P (·|s, a) has enough information to be used in reinforcement learning to implement dispatching in the factory, and the state transition probability P (·|s, a) having a characteristic that is completely independent of the past as described above can be expressed as in the following equation:

$$P(s_{t+1}=s'|s_t,a_t)=P(s_{t+1}=s'|s_t,a_t,s_{t-1},a_{t-1},s_{t-2},a_{t-2},s_{t-3}, a_{t-3},\ldots,s_{t-0},a_{t-0}), \quad (1)$$

RL is a set of algorithms that can handle MDP-based control problems under a very large state space and action space and uncertain state transition probabilities; RL learning algorithms are based on the estimation of value functions; and a value function indicative of the value of a state can be defined as follows:

$$V^\pi(s)=E_\pi[r_{t+1}+\gamma r_{t+2}+\gamma^2 r_{t+3}\ldots |s_t=s]=E_\pi[r_{t+1}+\gamma V^\pi(s_{t+1})|s_t=s] \quad (2)$$

As expressed in Equation (2) above, the value function represents an expected value of a discounted sum of rewards that will occur in the future from the current state. In other words, the value function is defined as a function of states representing an expectation of the sum of discounted future rewards under a policy π of a decision-maker (i.e., "dispatcher" in the present invention). For reference, the value function in Equation (2) may also be defined as the Q-function of state-action pairs as in Equation (3) below.

$$Q^\pi(s,a) = E_\pi[r_{t+1} + \gamma V^\pi(s_{t+1}) | s_t = s, a_t = a] \quad (3)$$

By estimating the value function under the policy π, it is possible to derive a better policy π' according to the following equation:

$$\pi'(s) = \arg\max_a Q^\pi(s, a) \quad (4)$$

Reinforcement Learning (RL) for Semi-Markov Decision Process (Semi-MDP)

Unlike typical MDPs that proceed based on the assumption that decisions are made at regular time intervals in a discrete-time horizon, actual factories are characterized in that decisions (e.g., a dispatching action, etc.) are made at irregular time intervals in a continuous-time horizon. Considering the characteristic in decision-making that occurs at irregular time intervals in the continuous-time horizon in such factories, some modifications of the typical MDP are inevitable, and such a modified MDP will be referred to as a semi-Markov decision process (semi-MDP or SMDP) herein below.

In other words, the dispatching method in a factory based on reinforcement learning in accordance with an embodiment of the present invention is characterized by constructing a semi-MDP based on the decisions occurring at irregular intervals in a continuous-time horizon when constructing the MDP, and a detailed description thereof will be set forth again later.

In the typical MDP, the discount factor γ for converting a future value into a present value is a constant between 0 and 1 and the reward r is not dependent on time intervals; however, the reward r and discount factor γ in constructing the semi-MDP for reinforcement learning to be applied to the dispatching method in a factory in accordance with an embodiment of the present invention can be modified into and utilized in forms that are dependent on the time interval τ between decision makings as follows:

$$r_{t+1} \rightarrow \int_0^\tau e^{-\beta k} r_{t+k} dk \quad (5)$$

$$\gamma \rightarrow e^{-\beta \tau} \quad (6)$$

Compared to the typical MDP based on decisions occurring at regular intervals in the discrete-time horizon, the reward r and discount factor γ terms may be modified as described above by appropriately taking into account the characteristics of dispatching actions issued in the course of manufacturing products in the factory, that is, the characteristics of decision-making that occurs at irregular time intervals in the continuous-time horizon, and a semi-MDP may be constructed and operated accordingly, thereby enabling the derivation of an optimal policy in the factory.

Approximation of Value Function

As described above, manufacturing plants typically have a very large state space and action space, an approximation of value functions may be further considered to estimate the value functions of such large-scale systems, and a parameterized value function approximation will be described as an example of a value function approximation herein below.

As a result of the parameterized function approximation, the value function can have a general function, a linear function, a non-linear function, or a neural network structure with state features dependent on the parameter vector $\vec{\theta}$ and can be expressed as in the following equation:

$$V(s) = \vec{\theta}^T \vec{\phi}(s) \text{ or } g(\vec{\phi}(s), \vec{\theta}) \quad (7)$$

Here, V(s) is the value function, $\vec{\theta}$ corresponds to the parameter vector, and $\vec{\phi}(s)$ is a basis function used for approximation. In the dispatching improvement in a factory based on reinforcement learning in accordance with an embodiment of the present invention, $\vec{\phi}(s)$ is expressed as a vector of dispatching scores of equipment. The value function V(s) resulting from the approximation can be expressed as the product of the parameter vector $\vec{\theta}$ and the dispatching score vector $\vec{\phi}(s)$.

For reference, the value function can be changed into a form in the parameter space by utilizing the function approximation, and since large-scale approximate dynamic programming assumes the state transition probability to be unknown, various stochastic gradient methods (SGDs) such as Adam, RMSProp, and so on may be used for sample backup.

Here, the dispatching score vector $\vec{\phi}(s)$ is used as a basis function when performing an approximation of the value function; one of the important concerns is what kind of approximation leads to an optimal result when utilizing the parameter vector additionally; as an example, it is more desirable to express an entire factory in terms of the number of workpieces, waiting time, processing time, the number of product types, and so on in that it reflects more information of the factory rather than expressing the entire factory as the number of workpieces; and if more information on the factory is contained in this way, it would be more desirable to reward according to the goals to be improved.

In order to satisfy these conditions, the concept of 'a dispatching score' described above was introduced, and therefore, the dispatching score vector $\vec{\phi}(s)$ utilized as a result of the function approximation can be defined as follows:

$$\vec{\phi}(s) = \begin{bmatrix} \vec{\phi}^1(s) \\ \vec{\phi}^2(s) \\ \vec{\phi}^3(s) \\ \vec{\phi}^4(s) \\ \vec{\phi}^5(s) \\ \vdots \\ \vec{\phi}^N(s) \end{bmatrix} \quad (8)$$

-continued $$\vec{\phi}^i(s) = \begin{bmatrix} F^{i,1}(s) \\ F^{i,2}(s) \\ F^{i,3}(s) \\ F^{i,4}(s) \\ F^{i,5}(s) \\ \vdots \\ F^{i,M_i}(s) \end{bmatrix}$$

Where $\vec{\phi}^i(s)$, denotes a vector of the dispatching scores $F^{i,j}(S)$ of the last selected job in machine i, $\vec{\phi}(s)$ denotes a vector of $\vec{\phi}^i(s)$ for all machines, and here, N denotes the number of machines in the station and M denotes the number of dispatching scores. In this way, the dispatching method in a factory based on reinforcement learning in accordance with an embodiment of the present invention can implement an approximation of a value function as a product of a parameter vector and a dispatching score vector, and utilize the vector of dispatching scores for the last selected job in the machine in generating the dispatching score vector, so that the dispatcher 10 can select and execute a job that maximizes the value of the approximated value function, thereby maximizing the operational efficiency of the factory.

In addition, the dispatching score vector $\vec{\phi}(s)$ reflecting the state feature has a characteristic that does not greatly depend on the system size, and therefore, the dispatching method in a factory based on reinforcement learning in accordance with an embodiment of the present invention can be readily applied not only to small/medium-sized systems but also to large-scale systems such as semiconductor plants.

FIG. 3B illustrates by way of example a detailed block diagram of the dispatcher 10 described above, and FIG. 4 is a flowchart for a dispatching method S400 in a factory based on reinforcement learning in accordance with an embodiment of the present invention.

The dispatcher 10 in accordance with an embodiment of the present invention may be configured to perform dispatching actions in a factory based on reinforcement learning, and the dispatcher 10 may comprise a control unit 11, a communication unit 12, an MDP construction unit 13, a reinforcement learning (RL) unit 14, a job selection unit 15, a storage unit 16, a power supply unit 17, and the like, as shown in FIG. 3B.

The control unit 11 may serve to control the overall operation, functions, and so on of the dispatcher 10 and control the operation and functions of the other elements (the communication unit 12, MDP construction unit 13, reinforcement learning unit 14, job selection unit 15, storage unit 16, power supply unit 17), and may be implemented, for example, with a controller, a micro-controller, a processor, a microprocessor, or the like.

The MDP construction unit 13 may construct an MDP for the dispatching actions of the dispatcher 10 in the factory and the resulting rewards and the states of the factory in S410. Here, the MDP construction unit 13 may be further configured to construct the MDP as a semi-MDP based on the decisions occurring at irregular intervals in the continuous-time horizon.

The reinforcement learning unit 14 may perform learning by applying RL to the constructed MDP in S420. Here, RL may be based on the estimation of a value function through an approximation of the value function, the value function resulting from the value function approximation may be expressed as a product of a parameter vector and a dispatching score vector, and the dispatching score vector may correspond to a vector of dispatching scores for the last selected job in the machine in question.

The job selection unit 15 may select a job that maximizes a weighted sum of a plurality of scored dispatching rules as a result of RL in S430. For example, the job selection unit 15 may be configured to select a job that maximizes the value of the value function approximated by the product of the parameter vector and the dispatching score vector. The present invention designed to select a job that maximizes a weighted sum of a plurality of scored dispatching rules as described above is different from a method for selecting an optimal dispatching rule out of a plurality of dispatching rules (e.g., Ramirez-Hernandez's method) or a method of selecting a weight to be applied to each dispatching rule (e.g., Chen's method).

In addition, the communication unit 12 may be a unit through which the dispatcher 10 communicates with other external elements, and may be a wired and/or wireless communication unit 12. More specifically, the communication unit 12 may transmit data from the control unit 11, storage unit 16, and the like by wire or wirelessly, or receive data from the outside by wire or wirelessly so as to transmit the data to the control unit 11 or to store in the storage unit 16. The data may include contents such as text, images, and videos, and user images.

The communication unit 12 may communicate through a local area network (LAN), Wideband Code Division Multiple Access (WCDMA), Long Term Evolution (LTE), Wireless Broadband Internet (WiBro), Radio Frequency (RF) communication, Wireless LAN, Wi-Fi (Wireless Fidelity), Near Field Communication (NFC), Bluetooth, infrared communication, and so on. However, these are merely exemplary, and various wired and wireless communication technologies applicable in the art may be used according to the embodiments to which the present invention is applied.

Further, the storage unit 16 may have stored thereon various data regarding the operation and function of the dispatcher 10. The data may include the dispatching actions of the dispatcher 10, states of the factory, rewards, constructed MDP and semi-MDP models, reinforcement learning algorithms, approximated value functions, parameter vectors, dispatching score vectors, etc., and the reinforcement learning unit 14 may perform learning based on the learning data stored in the storage unit 16.

For reference, the storage unit 16 may be implemented in various types of storage devices capable of inputting/outputting information such as an HDD (Hard Disk Drive), ROM (Read Only Memory), RAM (Random Access Memory), EEPROM (Electrically Erasable and Programmable Read Only Memory), flash memory, Compact Flash (CF) card, Secure Digital (SD) card, Smart Media (SM) card, MMC (Multimedia) card, Memory Stick, or the like, as is known to those skilled in the art, and may be provided inside the dispatcher 10 as shown in FIG. 3B or may be provided separately in an external device.

In addition, the dispatcher 10 in accordance with the present invention may further comprise a power supply unit 17 for supplying power to the dispatcher 10, and the dispatcher 10 configured as such may be embedded in a real-time dispatcher (RTD) or a real-time scheduler so as to configure a solution for reinforcement learning.

As described above, according to the dispatching method and apparatus in a factory based on reinforcement learning in accordance with an embodiment of the present invention, it is possible to select a job that maximizes the weighted sum of a plurality of dispatching scores by performing reinforcement learning on actions, rewards, and states in an environment within the factory, thereby maximizing the operational efficiency of the factory.

In addition, according to the dispatching method and apparatus in a factory based on reinforcement learning in accordance with an embodiment of the present invention, it is possible to apply more adaptively to an actual factory environment by changing and applying a Markov decision process by taking into account the characteristics of the actions of a dispatcher occurring in an environment within the factory.

Moreover, according to the dispatching method and apparatus in a factory based on reinforcement learning in accordance with an embodiment of the present invention, it is possible to learn and select, through reinforcement learning, a dispatching action that can simultaneously satisfy various objectives to be pursued in an environment within the factory, thereby maximizing the operational efficiency of the factory.

Meanwhile, various embodiments described herein may be implemented by hardware, middleware, microcode, software, and/or combinations thereof. For example, various embodiments may be implemented in one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions presented herein, or combinations thereof.

Further, for example, various embodiments may be recorded or encoded on a computer-readable medium including instructions. Instructions recorded or encoded on the computer-readable medium may cause a programmable processor or other processors to perform a method, for example, when the instructions are executed. The computer-readable medium may include computer storage media, which may be any available media that can be accessed by a computer. For example, such a computer-readable medium may include RAM, ROM, EEPROM, CD-ROM or other optical disk storage medium, magnetic disk storage medium or other magnetic storage device.

Such hardware, software, firmware, and the like may be implemented in the same device or in separate devices so as to support various operations and functions described herein. In addition, the elements, units, modules, components, etc. described as "~unit" in the present invention may be implemented together, or individually as logic devices that are separate but interoperable. The depiction of different features for the modules, units, etc. are intended to highlight different functional embodiments, and does not necessarily mean that these must be realized by individual hardware or software components. Rather, the functionality associated with one or more modules or units may be performed by separate hardware or software components or may be incorporated into common or separate hardware or software components.

Although the operations are illustrated in the drawings in a particular order, it should not be understood that these operations must be performed in the particular order illustrated or in a sequential order, or that all the operations illustrated need to be performed to achieve the desired results. In some environment, multitasking and parallel processing may be advantageous. Moreover, the division of various components in the embodiments described above should not be understood as requiring such division in all embodiments, and it should be understood that the components described may generally be incorporated together into a single software product or packaged into multiple software products.

As described above, preferred embodiments have been disclosed in the drawings and the description. Although specific terms have been used herein, these are used merely for the purpose of illustrating the present invention and not for limiting the meaning thereof or the scope of the present invention as defined in the claims. Thus, those having ordinary skill in the art will appreciate that various modifications and other equivalent embodiments are possible therefrom. Therefore, the true technical protection scope of the present invention should be defined by the spirit of the appended claims.

REFERENCE NUMERALS AND SYMBOLS

10: Dispatcher
11: Control unit
12: Communication unit
13: MDP construction unit
14: Reinforcement learning (RL) unit
15: Job selection unit
16: Storage unit
17: Power supply unit

What is claimed is:

1. A dispatching method in a factory based on reinforcement learning, comprising:
   constructing a Markov decision process (MDP) for dispatching actions of a dispatcher in the factory and resulting rewards and states of the factory;
   performing learning by applying reinforcement learning (RL) to the constructed MDP; and
   as a result of said RL, selecting a job that maximizes a weighted sum of a plurality of scored dispatching rules.

2. The dispatching method in a factory based on reinforcement learning of claim 1, wherein the MDP is constructed as a semi-Markov decision process (semi-MDP) based on decisions occurring at irregular intervals in a continuous-time horizon.

3. The dispatching method in a factory based on reinforcement learning of claim 2, wherein the rewards are set in a direction that simultaneously satisfies a plurality of objectives in the factory.

4. The dispatching method in a factory based on reinforcement learning of claim 2, wherein said RL is based on an estimation of a value function through an approximation of the value function.

5. The dispatching method in a factory based on reinforcement learning of claim 4, wherein as a result of the approximation of the value function, the value function is expressed as a product of a parameter vector and a dispatching score vector.

6. The dispatching method in a factory based on reinforcement learning of claim 5, wherein the dispatching score vector corresponds to a vector of dispatching scores for a last selected job in a machine in question.

7. The dispatching method in a factory based on reinforcement learning of claim 4, wherein the selecting a job that maximizes a weighted sum of a plurality of scored dispatching rules comprises selecting a job that maximizes a value of the approximated value function.

8. A computer readable recording medium, having recorded thereon a program configured to perform the method according to claim 1 by a computer.

9. A dispatcher configured to perform dispatching actions in a factory based on reinforcement learning, comprising:
- a Markov decision process (MDP) construction unit configured to construct an MDP for the dispatching actions of the dispatcher in the factory and resulting rewards and states of the factory;
- a reinforcement learning unit configured to perform learning by applying reinforcement learning (RL) to the constructed MDP; and
- a job selection unit configured to select a job that maximizes a weighted sum of a plurality of scored dispatching rules, as a result of said RL.

10. The dispatcher of claim 9, wherein the MDP construction unit is further configured to construct the MDP as a semi-Markov decision process (semi-MDP) based on decisions occurring at irregular intervals in a continuous-time horizon.

* * * * *